United States Patent
Anvari

(10) Patent No.: US 7,391,713 B2
(45) Date of Patent: Jun. 24, 2008

(54) PHASE ROTATION TECHNIQUE TO REDUCE CREST FACTOR OF MULTI-CARRIER SIGNALS

(75) Inventor: Kiomars Anvari, 1567 Serafix Rd., Alamo, CA (US) 94507

(73) Assignee: Kiomars Anvari, Alamo, CA (US)

( * ) Notice: Subject to any disclaimer, the term of this patent is extended or adjusted under 35 U.S.C. 154(b) by 693 days.

(21) Appl. No.: 10/747,562

(22) Filed: Dec. 30, 2003

(65) Prior Publication Data

US 2005/0141408 A1      Jun. 30, 2005

(51) Int. Cl.
*H04J 11/00*  (2006.01)
*H04B 1/10*  (2006.01)
*H04B 1/04*  (2006.01)

(52) U.S. Cl. ............... 370/206; 375/254; 375/296; 375/260; 455/114.2; 455/522

(58) Field of Classification Search .......... None
See application file for complete search history.

(56) References Cited

U.S. PATENT DOCUMENTS

| 5,302,914 A * | 4/1994 | Arntz et al. ............... 330/129 |
| 5,636,247 A * | 6/1997 | Kamerman et al. ......... 375/260 |
| 7,023,930 B2 * | 4/2006 | Clausen ..................... 375/260 |
| 2001/0022777 A1 * | 9/2001 | Bourget et al. ............. 370/210 |
| 2004/0264595 A1 * | 12/2004 | Kim ........................... 375/296 |
| 2006/0269011 A1 * | 11/2006 | Stewart ...................... 375/269 |

\* cited by examiner

*Primary Examiner*—Huy D. Vu
*Assistant Examiner*—Nittaya Juntima

(57) ABSTRACT

A technique for Crest Factor reduction of multi-carrier signals using phase rotation is described. The multi-carrier signal could be in digital baseband, analog baseband, or analog RF (radio frequency). The multi-carrier signal is converted to individual baseband representatives before each individual baseband signal being phase rotated according to an algorithm which maintains the crest factor to a pre-defined value. The algorithm uses a deterministic phase rotation technique and each phase rotated baseband signals will be individually filtered to remove the unwanted signals. The phase rotated and filtered baseband signals are then up converted and combined to reconstruct the multi-carrier signal. The crest factor reduction is limited by the in band distortion introduced to each individual signal.

11 Claims, 7 Drawing Sheets

PHASE ROTATION TECHNIQUE TO REDUCE CREST FACTOR OF MULTI-CARRIER SIGNALS

BACKGROUND OF INVENTION

The present invention relates to a Crest Factor reduction method that reduces the peak to average of a multi-carrier signal. The Crest Factor reduction method can be applied to multi-carrier signal whether it is a baseband signal, at an intermediate frequency (IF), or RF signal. In any wireless communication system one of the critical components is the power amplifier. This component has a major contribution in cost, power consumption, and size of the system. The main reason is the requirement of wireless radio communication system for linear amplifiers. The higher the linearity, the higher the power consumption, cost and size. In order to minimize the cost size and power consumption there is a need for techniques that overcome this problem. This invention conquers these challenges by using a simple and accurate Crest Factor reduction method to reduce the peak to average ratio of the input signal to the amplifier.

SUMMARY OF INVENTION

According to the invention, a Crest Factor reduction method, for use with multi-carrier signals, uses a plurality of simple and accurate technique in conjunction with intelligent signal processing to reduce the peak to average ration of the multi-carrier signals. By intelligent, it is meant that the Crest Factor reduction method has features of removing the unwanted signals after applying the crest factor reduction method. The Crest Factor reduction method can be applied to a multi-carrier baseband, IF or RF signal. The conditioning or Crest Factor reduction helps to boost the power handling of the amplifiers or makes it acts more linearly.

In a particular embodiment, the Crest Factor reduction method comprises of a down converter to baseband function, a function to perform phase rotation of each individual baseband signal, low pass filter function, up converter function, and a combiner function. The amount of the phase rotation is based on the peak to average ratio of the multi-carrier signal. The sign of the phase rotation is determined by an algorithm which takes each individual phase and amplitude information as its input.

The invention will be better understood by reference to the following detailed description in conjunction with the accompanying drawings.

DESCRIPTION OF THE SPECIFIC EMBODIMENTS

Figure 1:
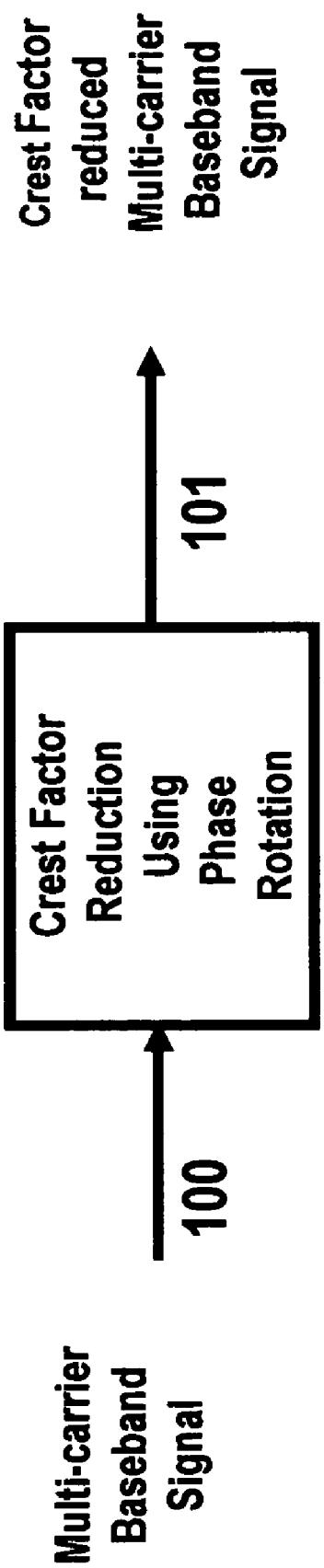
FIG. 1 is an overall block diagram of the Crest Factor reduction method.

In a first preferred embodiment the Crest Factor reduction method measures the peak to average ratio of the multi-carrier signal to determine the amount of phase rotation. In a second preferred embodiment of the invention, the Crest Factor reduction method down converts the multi-carrier signal and produce baseband representative of each carrier. In a third preferred embodiment the algorithm defines the sign and the value of the phase rotation applied to baseband representative of each carrier. In a fourth embodiment the baseband representative of each carrier is phase rotated. In a fifth embodiment the phase rotated representative of each signal is low pass filtered to remove unwanted signals. In a sixth embodiment the individual baseband signals are individually up converted and combined to reconstruct the multi-carrier digital baseband signal. Referring to FIG. 1, a Crest Factor reduction method is illustrated. The input to the Crest Factor reduction method block 200 is the multi-carrier signal 100. The output of the Crest Factor reduction method block 200 is multi-carrier signal 101 that has its peak to average reduced. The Crest Factor reduction method performs the following functions:

Finds the peak to average of the multi-carrier signal 100 to determine the amount of phase rotation.

Reduce the Crest Factor of the multi-carrier signal 100.

Removes the unwanted signals from the Crest Factor reduced signal to produce the new multi-carrier signal 101.

Figure 2:
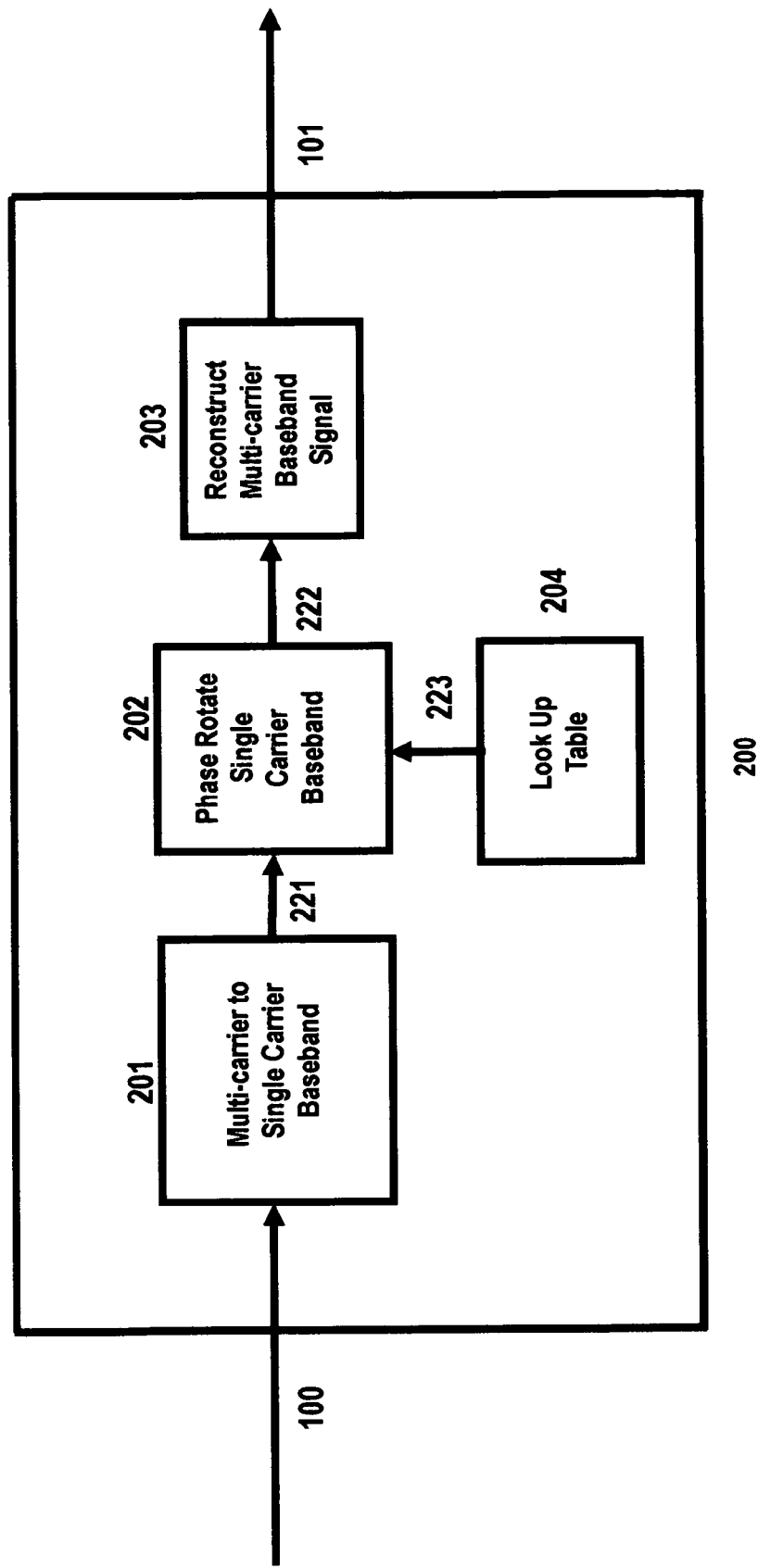
FIG. 2 is the block diagram of the Crest Factor reduction methods's components.

FIG. 2 illustrates the block diagram of the Crest Factor reduction method. The multi-carrier signal 100 is applied to down conversion block 201 to produce signal 221 which is the baseband representative of each carrier. Then the baseband representative of each carrier is phase rotated by block 202 to produce signal 222. The phase rotation value 223 is provided by lookup table 204. The phase rotated baseband representative of each carrier is up converted and combined in block 203 to produce the reconstructed multi-carrier signal 101

Figure 3:
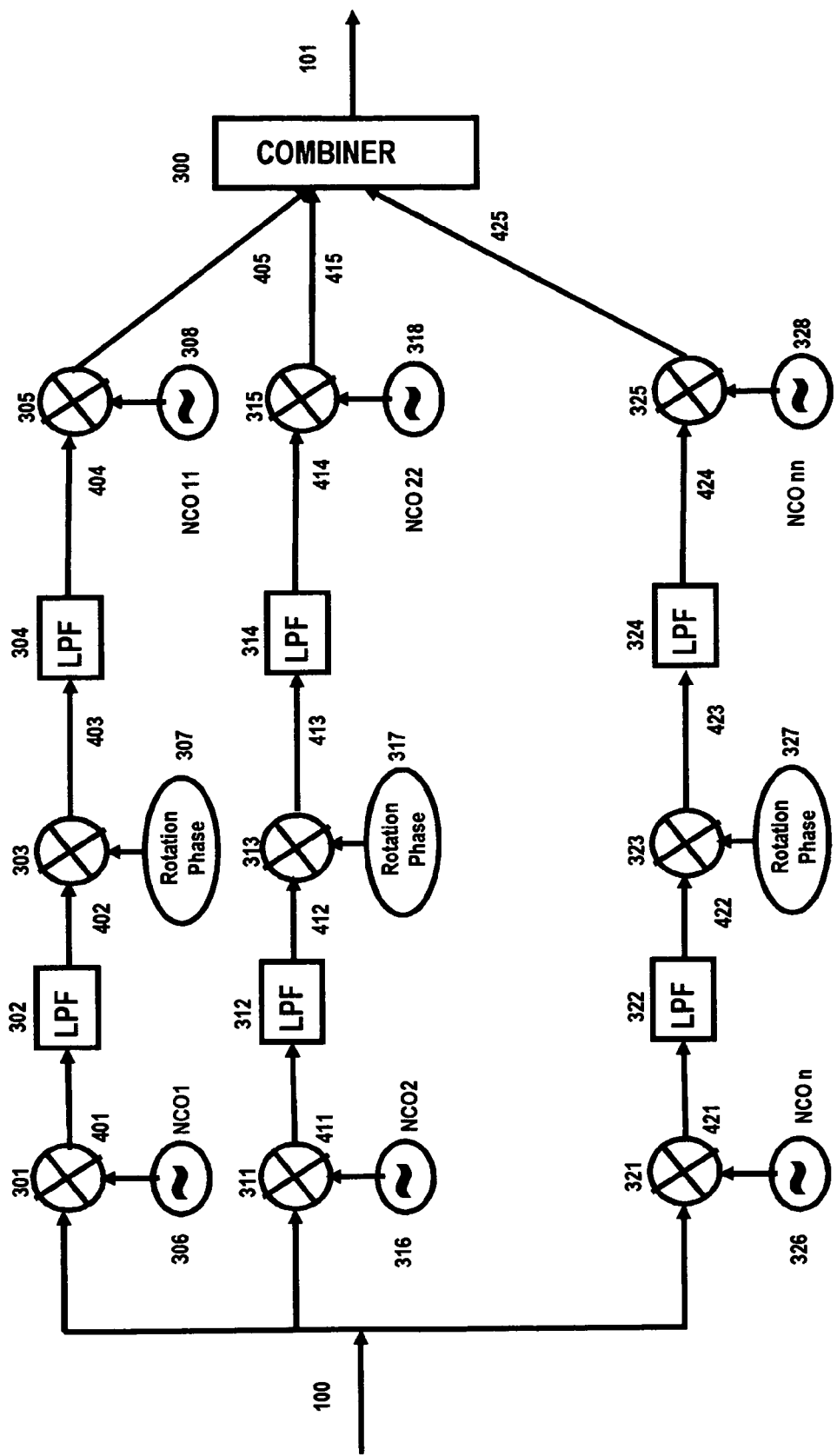
FIG. 3 is the detail block diagram of the Crest Factor reduction method.
Figure 4:
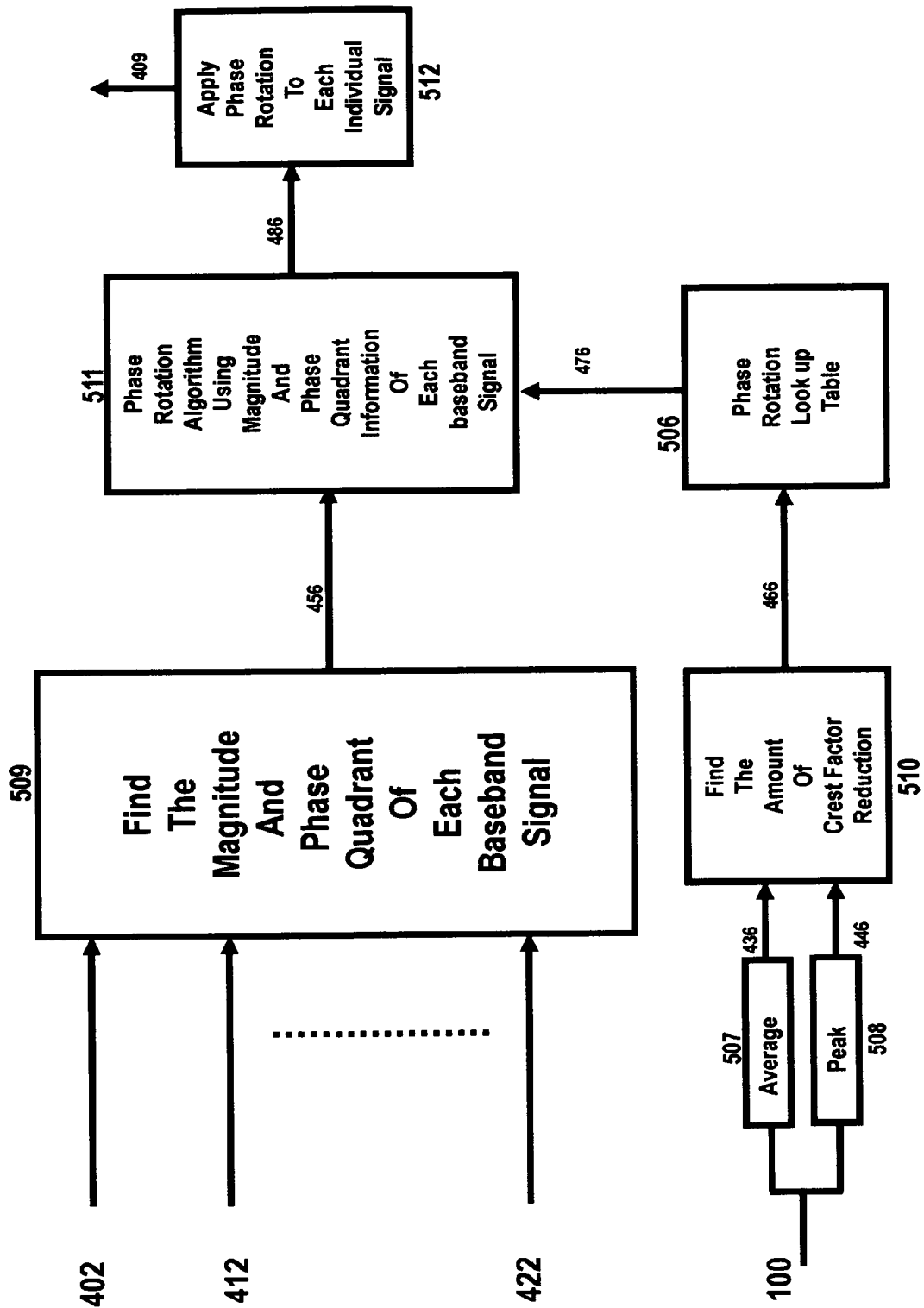
FIG. 4 is the detail block diagram of the main functions in phase rotation algorithm.

FIG. 3 shows the detail block diagram of the Crest Factor reduction method signal processing. The multi-carrier baseband signal 100 is applied to down converters 301, 311, and 321 to produce the baseband signal representative of each carrier 401, 411, and 421. The second input to down converters 301, 311, and 321 are supplied by NCOs 306, 316, and 326. The down converters 301, 311, 321 output is the baseband representative of an individual baseband carrier. The functions 301, 311, 321 are mixers that use the Numerical Control Oscillator (NCO) to down convert an individual baseband carrier to its baseband representative. The baseband representative of each carrier then is applied to Low Pass Filters (LPF) 302, 312, and 322 to filter unwanted signals. The filtered baseband representative of each carrier 402, 412, and 422 are applied to phase rotation blocks 303, 313, and 323. The phase rotation blocks 303, 313, 323 modify the phase of the baseband representative of an individual baseband carrier by a phase amount defined by phase rotation algorithm. The other signal used by phase rotation blocks are supplied by phase rotation algorithm blocks 307, 317, and 327. The phase rotated signals 403, 413, and 423 are then low pass filtered by filter blocks 304, 314, and 324 to produced phase rotated and filtered signals 404, 414, and 424. These signals are up converted by blocks 305, 315, and 325. The up convertion bocks 305, 315, 325 are mixers that up convert the baseband representative of each carrier to its baseband carrier. The second input to up conversion blocks are supplied by NCOs 308, 318, and 328. The up converted signals 405, 415, and 425 are then combined in block 300 to produced the new multi-carrier baseband signal 101. In FIG. 3 only a multi-carrier with 3 carrier is shown. This approach can be applied to unlimited number of carriers. FIG. 4 shows a high level block diagram of the phase rotation algorithm. The multicarrier signal 100 is applied to blocks 507 and 508 to produce the average signal 436 and peak signal 446. Then average value 436 and peak value 446 of the multi-carrier signal 100 are applied to block 510 to find the amount of the Crest Factor reduction. The Crest Factor reduction value 466, output of block 510 is applied to phase rotation lookup table block 506 to define the amount of phase rotation 476.

The baseband representative of the multi-carrier signal 100, signals 402, 412, and 422 are applied to block 509 to find each signal magnitude, phase and the quadrant they are in. The output of blocks 509 and 506 are applied to block 511. Block 511 uses the information 456 and 476 which are the magnitude, phase, and quadrant of baseband representative of each carrier together with the phase rotation value to find the appropriate phase rotation and the sign of the phase rotation. The final amount of phase rotation and its sign information 486 for baseband representation of each carrier is used by block 512 to produce the phase rotation value 409 which is applied to baseband representative of each carrier.

Figure 5:
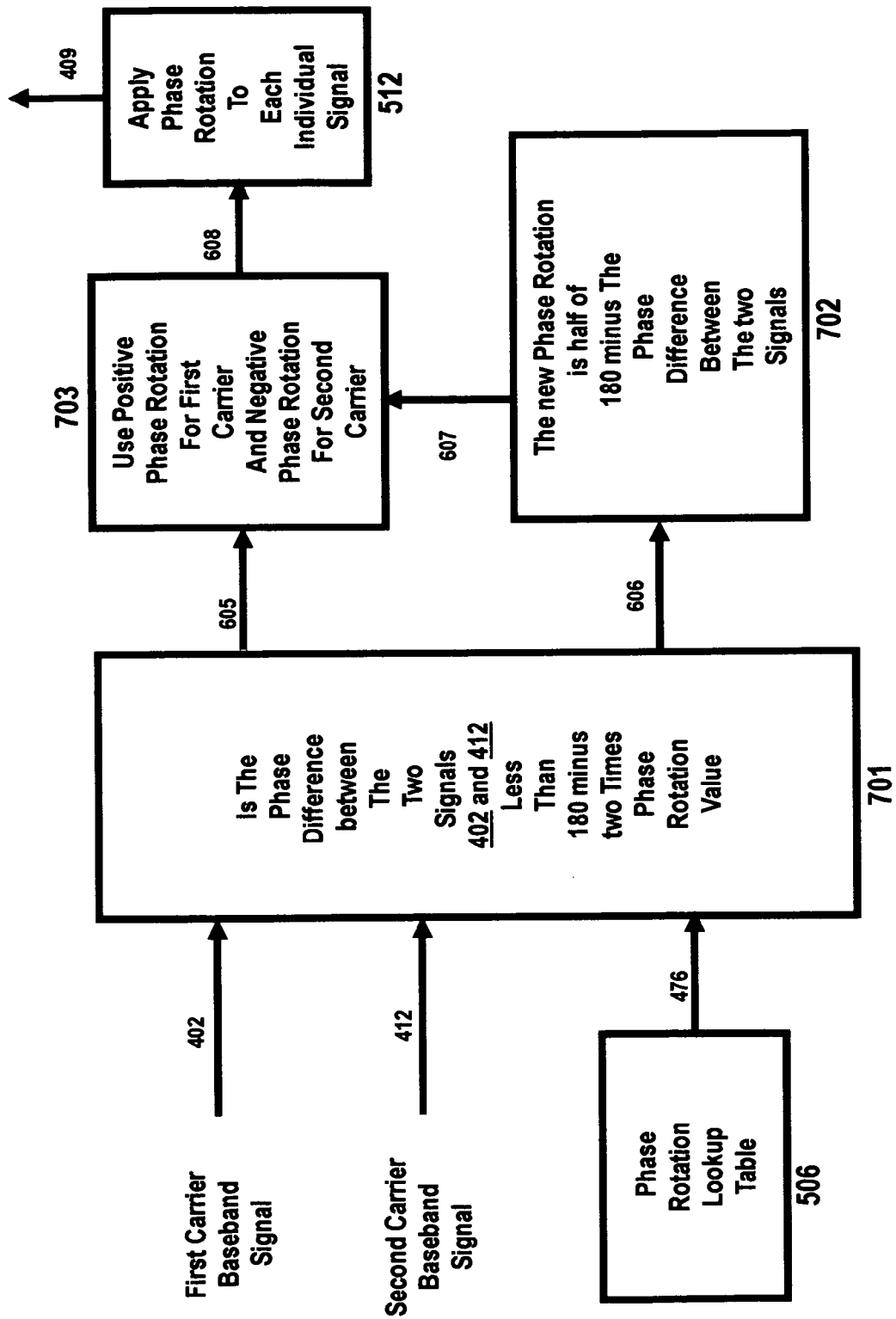
FIG. 5 is the detail block diagram of phase rotation algorithm when there are two carriers.
Figure 6:
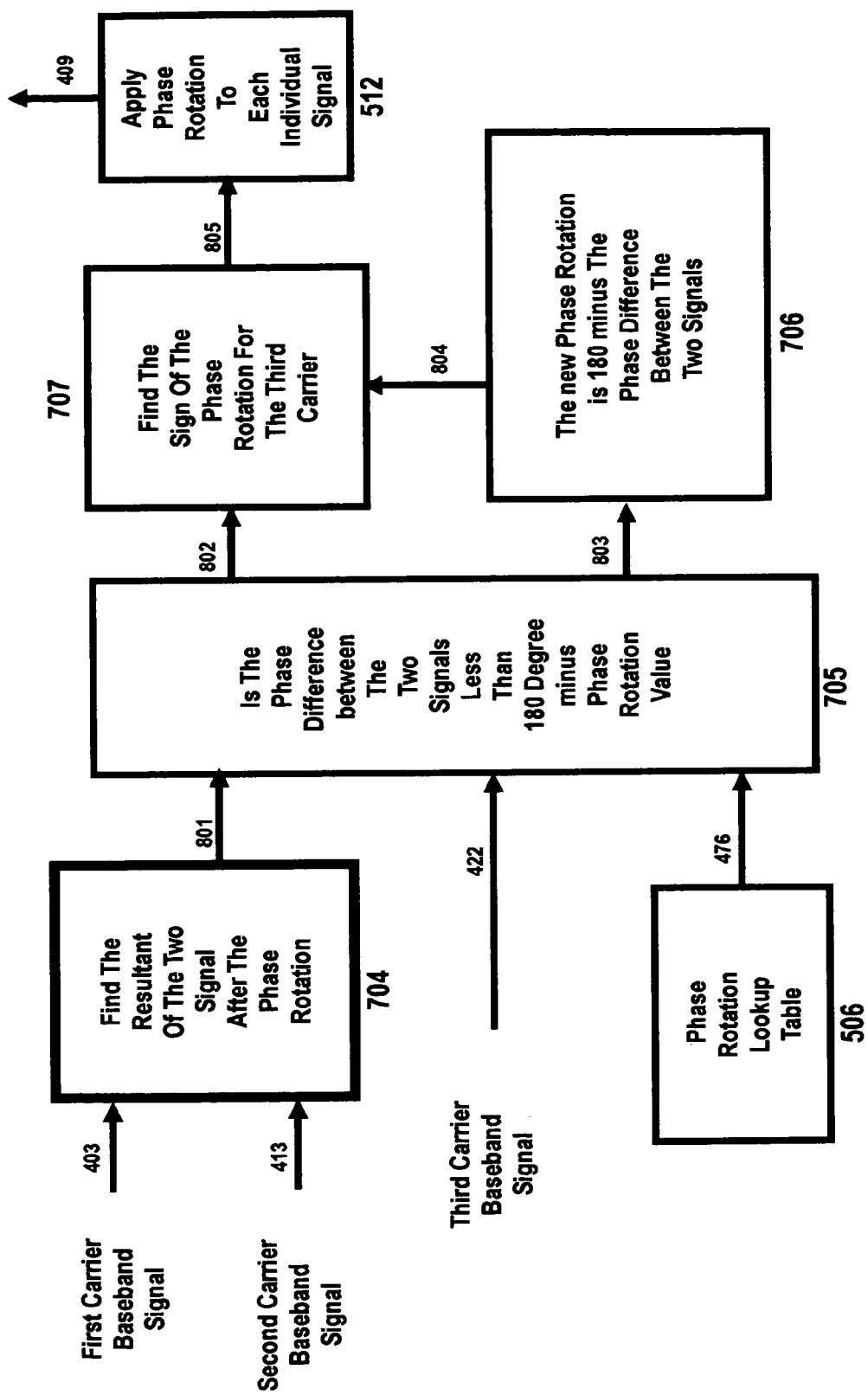
FIG. 6 is the detail block diagram of phase rotation algorithm when there are three carriers.

FIG. 5 is the block diagram of the phase rotation algorithm when the multi-carrier signal consist of two carriers. The baseband representative of the two carriers signals 402 and 412 are applied to block 701. Another input into block 701 is the phase rotation value 476 from phase rotation lookup table 506 which is being selected by the peak and average of the multi-carrier signal 100. Block 701 looks at the difference between the 180 and two times the phase rotation input from the phase rotation lookup table 506. If the result is less than the phase difference between the baseband representative of the two carriers, signals 402 and 412, then a new phase rotation has to be find by block 702 using the phase difference between the baseband representative of the two carries 606. The new phase rotation 607 is equal to one half of 180 minus phase difference between the baseband representative of the two carriers 606. The new value of the phase rotation 607 is sent to block 703. If the difference between the 180 and two times the phase rotation input from the phase rotation lookup table 506 is more than the phase difference between the baseband representative of the two carriers, signals 402 and 412, then the phase rotation value 605 which is the original phase rotation value 476 from lookup table 506 is sent to block 703. Block 703 assigns sign for the phase rotation for each carrier and send the phase rotation with its sign information 608 to block 512. Block 512 applies the phase rotations to baseband representative of each carrier. FIG. 6 is the block diagram of the phase rotation algorithm when the multi-carrier signal consist of three carriers. The phase rotated baseband representative of the first two carriers signals 403 and 413 are applied to block 704 to find the resultant of the two signals 801. The resultant signal 801 and the baseband representative 422 of the third carrier are applied to block 705. Another input into block 705 is the phase rotation value 476 from phase rotation lookup table 506 which is being selected by the peak and average of the multi-carrier signal 100. Block 705 looks at the difference between the 180 and the phase rotation input value from the phase rotation lookup table 506. If the result is less than the phase difference between the baseband representative of the third carrier and the signal 801, then a new phase rotation has to be find by block 706 for the baseband representative of the third carrier using the phase difference value 803 between the baseband signals. The new phase rotation is equal to 180 minus phase difference between the baseband representative of the third carriers and the resultant signal 803. The new value of the phase rotation 804 is sent to block 707. If the difference between the 180 and the phase rotation input from the phase rotation lookup table 506 is more than the phase difference between the baseband representative of the third carrier and signal 801, then the phase rotation value 802 which is the original phase rotation value 476 from lookup table 506 is sent to block 707. Block 707 assigns sign for the phase rotation for third carrier and send the phase rotation with its sign information 805 to block 512. Block 512 applies the phase rotations to baseband representative of third carrier.

Figure 7:
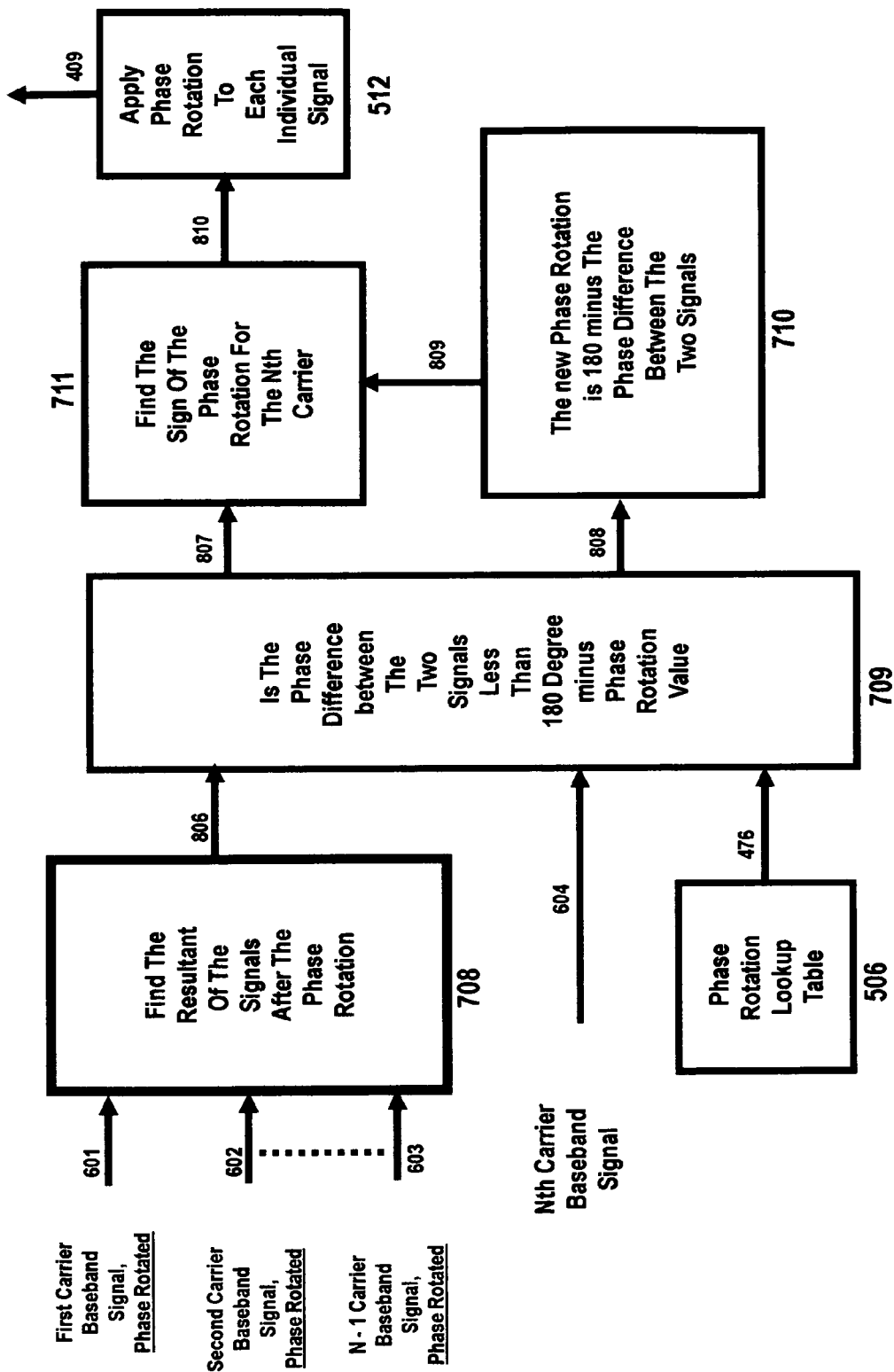
FIG. 7 is the detail block diagram of phase rotation algorithm when there are N carriers.

FIG. 7 is the block diagram of the phase rotation algorithm when the multicarrier signal consist of N carriers. The phase rotated baseband representative of the first N−1 carriers signals 601, 602, and 603 are applied to block 708 to find the resultant of the N−1 signals 806. The resultant signal 806 and the baseband representative 604 of the Nth carrier are applied to block 709. Another input into block 709 is the phase rotation value 476 from phase rotation lookup table 506 which is being selected by the peak and average of the multicarrier signal 100. Block 709 looks at the difference between the 180 and the phase rotation input value from the phase rotation lookup table 506. If the result is less than the phase difference between the baseband representative of the Nth carrier and the signal 806, then a new phase rotation has to be find by block 710 for the baseband representative of the Nth carrier using the phase difference value 808 between the baseband signals. The new phase rotation is equal to 180 minus phase difference between the baseband representative of the Nth carrier and the resultant signal 806. The new value of the phase rotation 809 is sent to block 711. If the difference between the 180 and the phase rotation input from the phase rotation lookup table 506 is more than the phase difference between the baseband representative of the Nth carrier and signal 806, then the phase rotation value 807 which is the original phase rotation value 476 from lookup table 506 is sent to block 711. Block 711 assigns sign for the phase rotation for Nth carrier and send the phase rotation with its sign information 810 to block 512. Block 512 applies the phase rotations to baseband representative of Nth carrier.

What is claimed is:

1. A Crest Factor reduction method for use with multi-carrier signals in an electronic equipment to decrease the peak to average ratio of a multi-carrier signal in at least one of wireless communication system, wireless cellular, wireless PCS, wireless LAN, line of sight microwave, military, and satellite communication systems, the Crest Factor reduction method comprising:

using a down conversion function to obtain the baseband representative of each carrier of a multi-carrier signal;

applying a phase rotation function to phase rotate the baseband representative of each individual carrier by:

using a peak to average ratio estimation function for a multi-carrier signal at baseband which includes intermediate frequency (IF) and radio frequency;

using a pre-defined phase look up table for phase rotation of the baseband representative of each carrier of the multi-carrier signal; and using a phase rotation algorithm to define a final value and sign of each phase rotation applied to the baseband representative of each carrier of the multi-carrier signal;

using a low pass filter to eliminate an unwanted signal from phase rotated baseband representative of each carrier of the multi-carrier signal; and using an up converter and combiner function to up convert the phase rotated and filtered baseband representative of each individual carrier to its original frequency and combine them to reconstruct a new Crest Factor reduced multi-carrier signal.

2. The Crest Factor reduction method according to claim 1, wherein the peak and average of the multi-carrier signal is used to define an initial phase rotation for the baseband representative of individual carriers.

3. The Factor reduction method according to claim 1, wherein the baseband representative of each individual carrier is phase rotated according to the phase rotation algorithm either in analog or digital domain.

4. The Factor reduction method according to claim 1, wherein the baseband representative of each carrier is filtered in digital or analog domain to remove unwanted signals without introducing any phase and amplitude distortion.

5. The Factor reduction method according to claim 1, wherein the phase rotated and filtered baseband representative of individual carriers are up converted back to their original frequency before being combined again to reconstruct the multi-carrier Crest Factor reduced baseband signal.

6. The Crest Factor reduction method according to claim 1, wherein the final phase rotation value that is applied to the baseband representative of each carrier keeps the baseband representative of each carrier in its original quadrant and does not introduce any error when the signal goes through demodulation and detection.

7. The Crest Factor reduction method according to claim 1, wherein the phase rotation algorithm finds a value of each phase rotation applied to baseband representative of individual carrier by:
 starting with two original carriers that have the most contribution in a Crest Factor and applying an initial or final phase rotation to the two carriers,
 using a phase difference between the baseband representative of the two carriers to find a new and final phase rotation value, and
 choosing a phase rotation that when applied to the baseband representative of the two original carriers their phase difference does not exceed 180.

8. The Crest Factor reduction method according to claim 1, wherein the phase rotation algorithm uses a resultant of the phase rotated baseband representative of first two carriers to find a final phase rotation value for the baseband representative of a third carrier by:
 using a phase difference between the resultant of the baseband representative of the first two carriers and the baseband representative of the third carrier to find a new and final phase rotation value for the baseband representative of the third carrier, and
 choosing a phase rotation that when applied to the baseband representative of the third carrier then a phase difference between the resultant of the phase rotated baseband representative of the first two carriers and the third carrier does not exceed 180.

9. The Crest Factor reduction method according to claim 1, wherein the phase rotation algorithm uses a resultant of the phase rotated baseband representative of the first N−1 carriers to find a final phase rotation value for the baseband representative of the Nth carrier by:
 using a phase difference between the resultant of the baseband representative of the first N−1 carriers and the baseband representative of the Nth carrier to find a new and final phase rotation value for the baseband representative of the Nth carrier, and
 choosing a phase rotation that when applied to the baseband representative of the Nth carrier then a phase difference between the resultant of the phase rotated baseband representative of the first N−1 carriers and the Nth carrier does not exceed 180.

10. The Crest Factor reduction method according to claim 1, wherein the method is used in electronic equipment for at least one of wireless cellular, wireless PCS, wireless LAN, microwave, wireless satellite, none wireless amplifiers, and any wireless communication systems used for military applications.

11. The Crest Factor reduction method according to claim 1, wherein the method is implemented in at least one of programmable logic, Field Programmable Gate Array (FPGA), Gate Array, Application Specific Integrated Circuit (ASIC), and Digital Signal Processor (DSP).

* * * * *